(12) United States Patent
Jayaram (10) Patent No.: US 10,542,322 B2
(45) Date of Patent: *Jan. 21, 2020

(54) PROVIDING A PROGRAM LISTING

(71) Applicant: Google LLC, Mountain View, CA (US)

(72) Inventor: Ranjith Jayaram, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/969,321

(22) Filed: May 2, 2018

(65) Prior Publication Data

US 2018/0255365 A1 Sep. 6, 2018

Related U.S. Application Data

(63) Continuation of application No. 15/255,867, filed on Sep. 2, 2016, now Pat. No. 9,973,826, which is a
(Continued)

(51) Int. Cl.
*H04N 21/482* (2011.01)
*G06F 16/245* (2019.01)
(Continued)

(52) U.S. Cl.
CPC ... *H04N 21/4826* (2013.01); *G06F 16/24578* (2019.01); *H04L 51/04* (2013.01); *H04L 51/32* (2013.01); *H04L 67/306* (2013.01); *H04N 21/2408* (2013.01); *H04N 21/252* (2013.01); *H04N 21/25866* (2013.01); *H04N 21/4312* (2013.01); *H04N 21/44222* (2013.01);
(Continued)

(58) Field of Classification Search
CPC ......... H04N 21/2409; H04N 21/25866; H04N 21/4826; H04N 21/2408; H04N 21/252; H04N 21/44222; H04N 21/4821; H04N 21/4312; H04N 21/4532; H04N 21/4788; H04N 21/84; G06F 16/24578; H04L 67/306; H04L 51/04; H04L 51/32
USPC ............................................... 725/44, 46, 47
See application file for complete search history.

(56) References Cited

U.S. PATENT DOCUMENTS 7,966,638 B2 6/2011 Gossweiler et al.
8,019,875 B1 9/2011 Nielsen
(Continued)

OTHER PUBLICATIONS

Bergman, C., "All About Social TV—Hulu gets social with Facebook integration", Lost Remote, last updated Jul. 12, 2011, pp. 1-4, available at:www.lostremote.com/2011/07/12/hulu-gets-social-with-facebook-integration, last accessed Sep. 21, 2011.
(Continued)

*Primary Examiner* — Dominic D Saltarelli
(74) *Attorney, Agent, or Firm* — Byrne Poh LLP (57) ABSTRACT

Systems and methods for providing a program listing include storing user profile data and a user identifier for a user; storing an association of the user identifier with user identifiers for each of the plurality of social contacts of the user; receiving program identifier data representing programs currently being viewed by the social contacts; ranking the program identifier data for each of the plurality of social contacts based at least in part on the user profile data; and sending display data representing the program identifier data for display in an order based on the ranking.

23 Claims, 7 Drawing Sheets

Related U.S. Application Data continuation of application No. 14/721,901, filed on May 26, 2015, now Pat. No. 9,438,961, which is a continuation of application No. 13/342,893, filed on Jan. 3, 2012, now Pat. No. 9,055,311.

(51) Int. Cl.

| | | |
|---|---|---|
| *H04N 21/24* | (2011.01) | |
| *H04N 21/258* | (2011.01) | |
| *G06F 16/2457* | (2019.01) | |
| *H04N 21/25* | (2011.01) | |
| *H04N 21/442* | (2011.01) | |
| *H04L 29/08* | (2006.01) | |
| *H04L 12/58* | (2006.01) | |
| *H04N 21/431* | (2011.01) | |
| *H04N 21/45* | (2011.01) | |
| *H04N 21/4788* | (2011.01) | |
| *H04N 21/84* | (2011.01) | |

(52) U.S. Cl.
CPC ..... *H04N 21/4532* (2013.01); *H04N 21/4788* (2013.01); *H04N 21/4821* (2013.01); *H04N 21/84* (2013.01)

(56) References Cited

U.S. PATENT DOCUMENTS

| | | | |
|---|---|---|---|
| 8,307,389 | B2 | 11/2012 | Sakai et al. |
| 2002/0112239 | A1 | 8/2002 | Goldman |
| 2002/0166122 | A1 | 11/2002 | Kikinis et al. |
| 2003/0093329 | A1* | 5/2003 | Gutta ................. G06Q 30/0601 705/26.1 |
| 2005/0091694 | A1 | 4/2005 | Rambo |
| 2008/0059455 | A1 | 3/2008 | Canoy et al. |
| 2008/0065249 | A1 | 3/2008 | Pang |
| 2009/0077633 | A1 | 3/2009 | Icho et al. |
| 2009/0094656 | A1 | 4/2009 | Carlucci |
| 2009/0293079 | A1 | 11/2009 | Mckee et al. |
| 2012/0050617 | A1 | 3/2012 | Mizutani et al. |
| 2013/0014222 | A1 | 1/2013 | Bhatia et al. |
| 2013/0018960 | A1 | 1/2013 | Knysz et al. |

OTHER PUBLICATIONS

Into Now, "Connect with your friends around the shows you love", pp. 1-2, available at: www.intonow.com/ci, last accessed Sep. 21, 2011.
Jamcloud, "Spread the Web", pp. 1-5, available at: www.jamcloud.com, last accessed Sep. 21, 2011.
MLB, "How can I access Picture in Picture, Quad View, and other viewing options in the MLB. TV Media Player?", MLB, pp. 1-2, available at: www.mlb.mlb.com/mlb/help/faq_subscriptions.jsp, last accessed Sep. 21, 2011.
Notice of Allowance dated Jan. 9, 2018 in U.S. Appl. No. 15/255,867.
Notice of Allowance dated Feb. 4, 2015 in U.S. Appl. No. 13/342,893.
Notice of Allowance dated May 4, 2016 in U.S. Appl. No. 14/721,901.
Notice of Allowance dated Jun. 10, 2015 in U.S. Appl. No. 13/342,900.
Office Action dated Jan. 9, 2015 in U.S. Appl. No. 13/342,900.
Office Action dated May 8, 2017 in U.S. Appl. No. 15/255,867.
Office Action dated May 23, 2014 in U.S. Appl. No. 13/342,893.
Office Action dated Jun. 29, 2017 in U.S. Appl. No. 15/255,867.
Office Action dated Jul. 16, 2014 in U.S. Appl. No. 13/342,900.
Office Action dated Jul. 17, 2013 in U.S. Appl. No. 13/342,893.
Office Action dated Oct. 16, 2014 in U.S. Appl. No. 13/342,893.
Office Action dated Oct. 16, 2017 in U.S. Appl. No. 15/255,867.
Office Action dated Oct. 22, 2013 in U.S. Appl. No. 13/342,893.
Office Action dated Dec. 18, 2015 in U.S. Appl. No. 14/721,901.
Pavlus, J., "Remote Makes Channel Surfing Social", Fastco Design, pp. 1-5, last updated Sep. 1, 2010, available at: http://www.fastcodesign.com/1662794/twitter-powered-tv-remote-makes-channel-surfing-social, last accessed Sep. 21, 2011.

* cited by examiner

PROVIDING A PROGRAM LISTING

CROSS-REFERENCE TO RELATED APPLICATION

This application is a continuation of U.S. patent application Ser. No. 15/255,867, filed Sep. 2, 2016, which is a continuation of U.S. patent application Ser. No. 14/721,901, filed May 26, 2015, which is a continuation of U.S. patent application Ser. No. 13/342,893, filed Jan. 3, 2012, each of which is hereby incorporated by reference herein in its entirety.

BACKGROUND

The present disclosure relates generally to systems and methods for providing program content and more particularly, to ranking programming content according to programs being viewed by a plurality of social contacts.

SUMMARY

Implementations of the systems and methods of providing program content are described herein. One implementation is a method for providing a program listing of programs being viewed by a plurality of social contacts. The method may include storing user profile data and a user identifier for a user. The method may also include storing an association of the user identifier with user identifiers for each of the plurality of social contacts of the user. The method may further include receiving, from the plurality of social contacts of the user, program identifier data representing programs currently being viewed by the social contacts. The method may yet further include ranking the program identifier data for each of the plurality of social contacts based at least in part on the user profile data. The method may also include sending display data representing the program identifier data for display in an order based on the ranking. The method may include receiving a user selection of one of the program identifiers from the user. The method may also include determining whether the user has access to a program source providing the program identified by the program identifier. The method may include, based on the determination, sending display data representing the selected program to the user.

Another implementation is a method for providing a program listing of programs being viewed by a plurality of social contacts. The method may include storing user profile data and a user identifier for a user. The method may also include storing an association of the user identifier with user identifiers for each of the plurality of social contacts of the user. The method may yet further include receiving program identifier data representing programs currently being viewed by the social contacts. The method may include ranking the program identifier data for each of the plurality of social contacts based at least in part on the user profile data. The method may also include sending display data representing the program identifier data for display in an order based on the ranking.

Another implementation is a system for providing a program listing of programs being viewed by a plurality of social contacts. The system may include a tangible computer-readable storage device comprising instructions; and one or more processors coupled to the tangible computer-readable storage device and configured to execute the instructions to perform operations including storing user profile data and a user identifier for a user; storing an association of the user identifier with user identifiers for each of the plurality of social contacts of the user; receiving program identifier data representing programs currently being viewed by the social contacts; ranking the program identifier data for each of the plurality of social contacts based at least in part on the user profile data; and sending display data representing the program identifier data for display in an order based on the ranking.

These implementations are mentioned not to limit or define the scope of the disclosure, but to provide an example of an implementation of the disclosure to aid in understanding thereof. Particular implementations can be developed to realize one or more advantages.

The details of one or more implementations of the disclosure are set forth in the accompanying drawings and the description below. Other features, aspects, and advantages of the disclosure will become apparent from the description, the drawings, and the claims.

DETAILED DESCRIPTION

The implementations of the present disclosure may enhance a viewing experience of a user by (1) showing what the user's social contacts are viewing, (2) ranking the programs according to social contacts, and (3) allowing the user to select one of the programs for viewing. Other implementations of the present disclosure enable the user to share the programs that they are currently viewing, the programs that they recommend, etc. The multi-pane display provides multiple shared channels simultaneously to the user to allow the user to easily locate and select a program for viewing.

The features disclosed herein may be implemented on a legacy television module (e.g., internet connectivity is not available.) The features disclosed herein may be implemented on a smart television module (or connected television module, hybrid television module, etc.), which may include a processing circuit configured to integrate internet connectivity with more traditional television programming sources (e.g., received via cable, terrestrial, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, images and other content on the web, on a local cable TV channel, on a satellite TV channel, or stored on a local hard drive.

A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc.

The smart television module may further be configured to provide an electronic programming guide to a user. Companion applications to the smart television module may be operable on a mobile computing device to provide additional information about available programs to a user, to allow the user to control the smart television module, etc. In alternate implementations, the companion applications and features described herein may be implemented on a laptop computer or other personal computer, a smart phone, other mobile phone, handheld computer, a tablet PC, or other computing device.

Figure 1A:
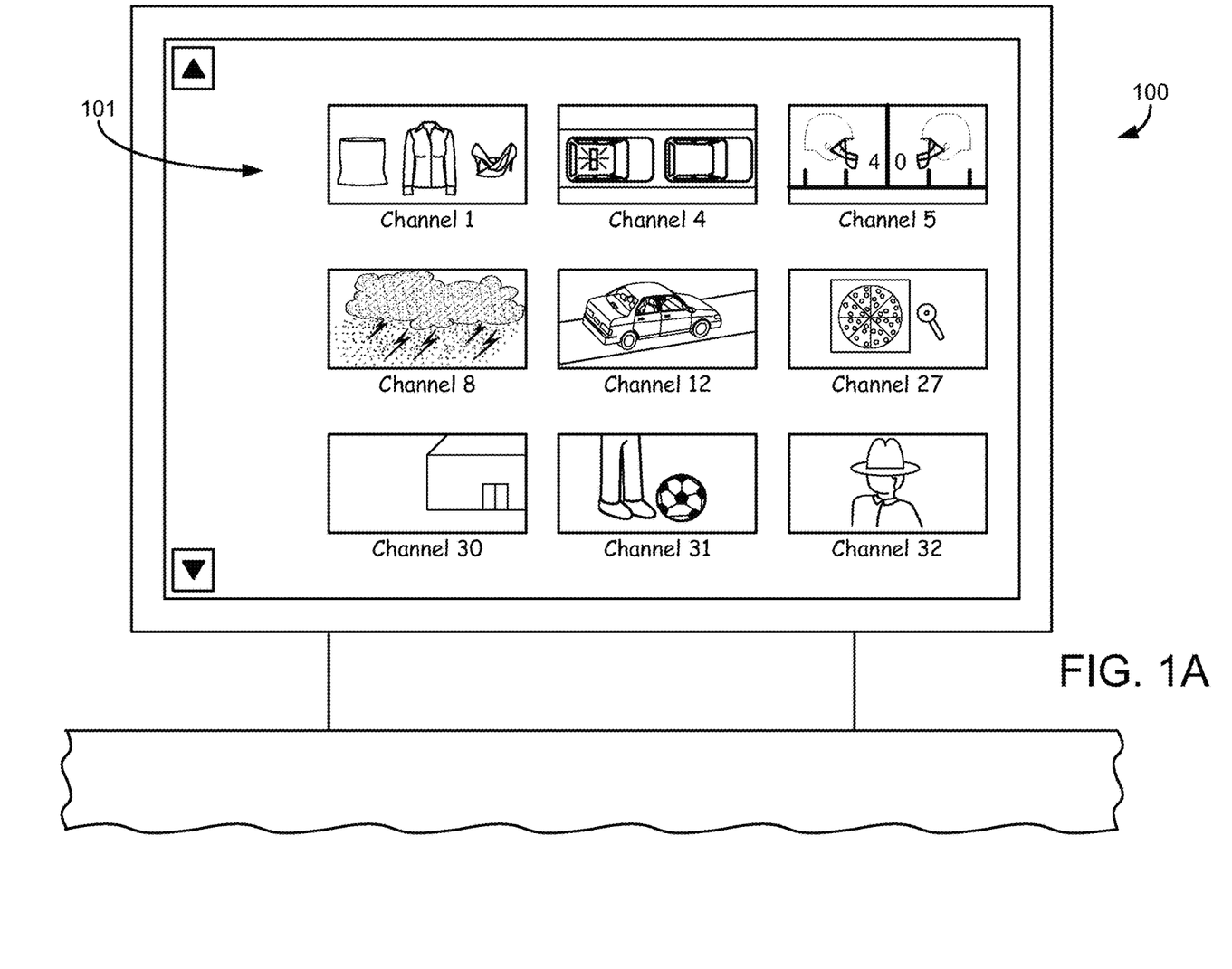
FIG. 1A illustrates a user interface in accordance with a described implementation.

FIG. 1A illustrates an example user interface in accordance with a described implementation. In FIG. 1A, program content is received from a media source and displayed on a display device. The program content may include streaming content, webpage/website content, image content, etc. The display device may include, but is not limited to, an internet-enabled television, a legacy television (not internet enabled), a tablet, notepad, or any other appropriate device that may display program content.

In some implementations, the program content may be provided by an application operating on a computing device. In some implementations, the computing device may include, but is not limited to, a DVR, a DVD player, a set-top box, an integrated internet television device, a smartphone, a tablet personal computer, a laptop, a projector screen, etc.

The computing device may be configured to receive an electronic programming guide and/or provide an electronic programming guide from the provider of the program content. The computing device may also be configured to receive, from the user, a user input to select a program, share a program, recommend a program, etc. In some implementations, the user input may be a request to arrange, organize, or rank a program listing. In some implementations, the user input may be a request to share, recommend, or take another action with respect to the program. The user input may be stored by the computing device for retrieval by the application, the program content provider, etc. The user input may also be used to update or modify the user's preferences.

The computing device may also be configured to display a user input device, for example, a "program listing selection" input device. The user input device may appear within the display of the computing device, e.g., as an overlay. In some implementations, the overlay is a touch screen. The user input device may also be an external mechanism to the computing device, e.g., a remote control, a d-pad or directional pad, etc.

User interface 100 may display a number of applications, e.g., games, web-browsing applications, etc. User interface 100 may include a screen at start-up, i.e., a welcome or home screen. The welcome screen may be set as a default by the system or set by the user. In some implementations, the welcome screen displays a number of applications, e.g., most popular, most-viewed, and an icon or link to any application that may be launched by a user.

User interface 100 may include a sharing application. For example, the user may share a current television program with a circle(s) of friends, e.g., using a sharing application. The sharing application may implement social networking. For example, the user may provide program and/or channel information to a social networking website. The sharing application may also be included on or provided by the social networking website.

The user may also share program content using any device that acts as a remote control, e.g., mobile computing device, d-pad, projection device, etc. In some implementations, the mobile computing device may also be used to recognize a program that is being currently viewed, e.g., using sound pattern recognition. For example, for a legacy television, the mobile computing device may recognize the program using auditory signals. The mobile computing device may receive the auditory signals and provide the auditory signals to a server. The server may apply sound pattern recognition processing using a comparison engine. The comparison engine may compare segments of audio or other characteristics of the segment of audio to other audio segments in a database to determine a match. Once a match is determined, the engine provides the match, which may then be received by the mobile computing device as program identifier data.

The user may share program content (e.g., program identifier data or other metadata) from the mobile computing device directly to the social networking website. The user may also select a user profile or account on the mobile computing device, television, etc. to share from. For example, households may have multiple accounts configured on one device and the sharing application includes a confirmation screen with log-in identifier, etc. to make sure the user that is sharing the program content matches the correct account.

User interface 100 may include a program listing application display 101 as shown in FIG. 1A. The program listing display 101 may be the initial screen for a user, i.e., the welcome screen, which is displayed upon the user launching the application. The program listing display 101 may be included in user favorites, as part of another application, or included in another similar easy-to-locate section of the display of the user interface 100.

The program listing display 101 may include a listing of all programs that are currently available according to the electronic programming guide. The program listing display 101 may include a listing of programs that may be available at a later date/time. In some implementations, the program listing display 101 may include currently viewed episodes, previously-viewed episodes, upcoming episodes, episodes viewed by friends, etc.

The program listing display 101 may include a listing of programs selected, sorted or organized based on the user's past viewing habits, the user's location, the user's device, the user's profile, the user's preferences, etc. For example, the program listing display 101 may include a listing of programs on the user's television that varies from the listing of programs that are included on the user's mobile device. In some implementations, the user's mobile device may be used to provide the program listing display 101 on another user's device, such as the other user's television.

In some implementations, the program listing display 101 may include a genre that has been selected by the user. For example, the user may only want sports-related program content to be included within the program listing display 101. The program listing display 101 will then include only sports-related program content. The user may select sublevels within the genre. For example, sports-related program content may be further defined as only baseball-related programs. Baseball-related programs may be further defined as only baseball games, baseball movies, etc.

The program listing may be displayed in a number of formats. The program listing format may be selected by the system and/or selected by the user. For example, FIG. 1A provides boxes horizontally aligned on the screen. In some implementations, the program listing display 101 provides a text-based program listing, e.g., a list without images. The text may comprise a program identifier data, a program channel, an identifier of the social contact viewing the program (e.g., name, thumbnail image, nickname, email address, etc.).

In other implementations, the program listing display 101 provides a program listing using audio as a guide for the user, e.g., the program listing display 101 is verbally communicated to the user using only sounds (e.g., a screen reader). In some implementations, the program listing display 101 includes more or fewer boxes than shown in FIG. 1A. In some implementations, the program listing display 101 includes graphical representations other than boxes. In some implementations, the program listing display 101 includes more or less information than shown in FIG. 1A. The program listing display 101 may include a scrollbar to search through the program listing, as shown in FIG. 1A as vertically positioned. In other implementations, the scrollbar may be horizontally positioned. The scrollbar may be interchangeable with buttons, icons, or other representations that allow the user to search through the program listing. The program listing display 101 may also provide a social surfing mode.

Figure 1B:
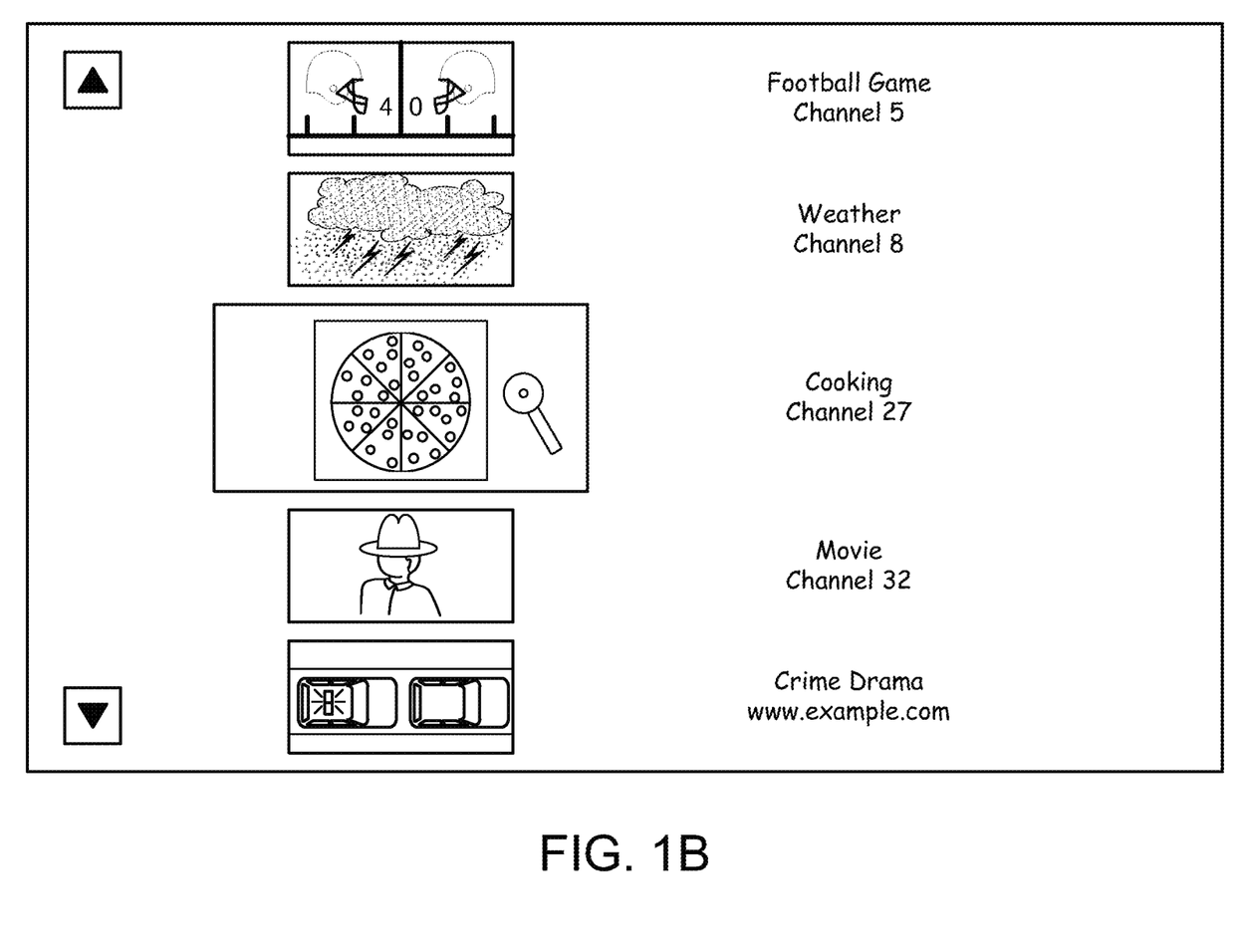
FIG. 1B illustrates a user interface in accordance with a described implementation.

In FIG. 1B, user interface 100 displays an example of the social surfing mode. For a smart television module (e.g., having internet connectivity), the user may "social surf" on the television itself. For a legacy television, the user may "social surf" on the mobile computing device. In some implementations, the social surfing mode may be its own standalone application. The social surfing mode is a live mode, i.e., the display of the user interface 100 may update as the programs that the social contacts are viewing change. The user interface 100 may update in real time to display the latest programs that the social contacts are viewing, are recommending, etc.

In the social surfing mode, the user may select programs based on a number of factors including, but not limited to, what the user's social contacts are viewing, what the user's social contacts have shared with the user, what the user's social contacts have previously viewed, what the user's social contacts have recommended, etc. The user may browse through programs that other social contacts are currently viewing, have previously viewed, have tagged for future viewing, have recommended, have provided an input rating (e.g., "+1", "like", etc.), etc.

The social surfing mode may provide an organization, order or arrangement of programs. In some implementations, the social surfing mode may organize the programs in an order based on a ranking. In FIG. 1B, the ranking is based on the number of social contacts that are currently viewing each program, with football game being the most popular currently viewed program among the social contacts. The programs may be organized in a ranking according to many different factors including, but not limited to, what the user is most likely to view based on user profile data such as interests, viewing history, etc., how many social contacts are currently viewing a program (such as in FIG. 1B), how many social contacts previously viewed the program, how many social contacts recommended the program, etc. The program identifiers or fields may include an image of the program, streaming media of the program, audio of the program, text of the program, etc. In some implementations, the ranking may be provided to the user in real time. For example, as the social contacts view the programs, recommend programs, etc.

Figure 1C:
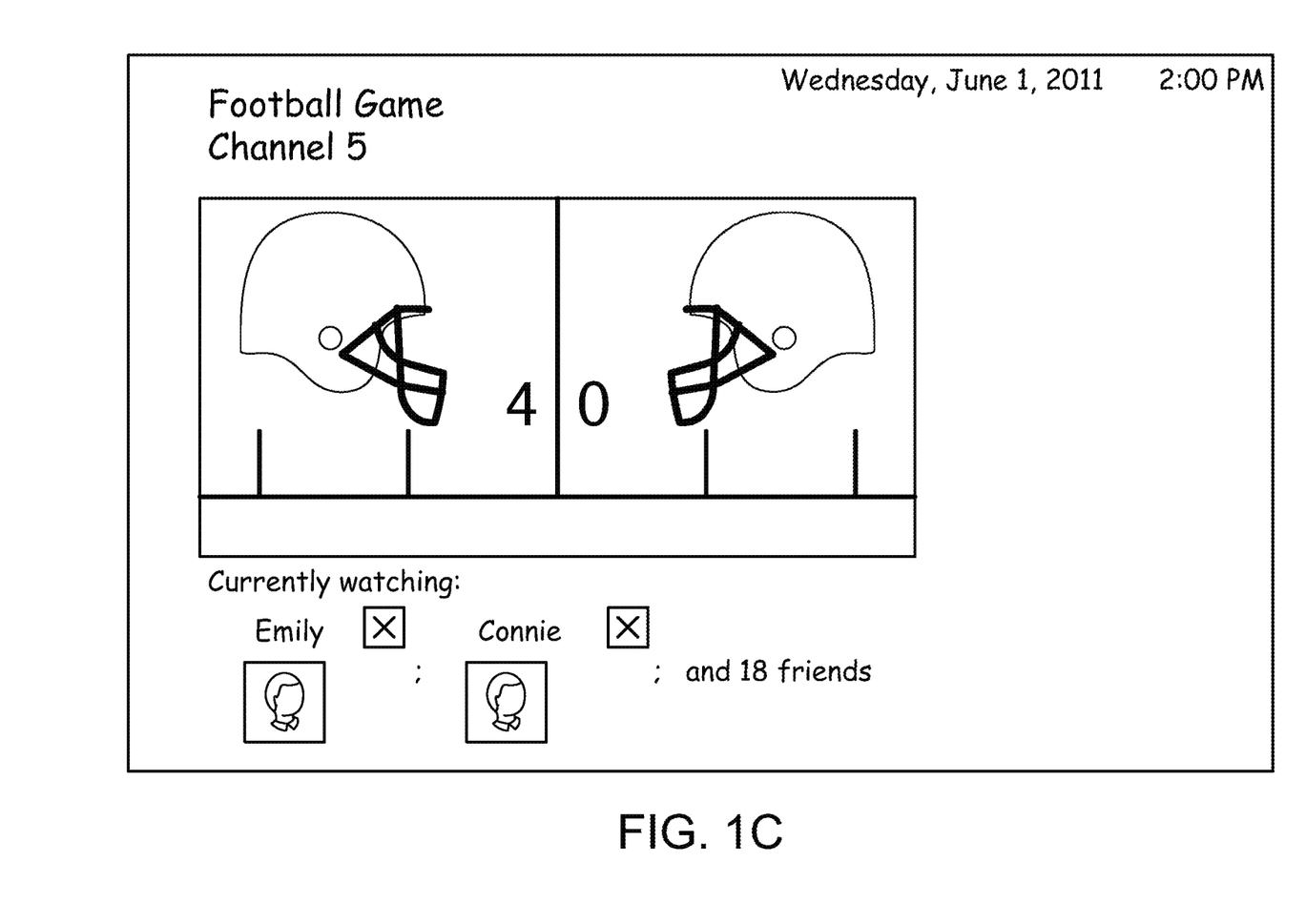
FIG. 1C illustrates a user interface in accordance with a described implementation.

In FIG. 1B, the organization is shown in a vertical listing, ordered from top to bottom. For example, football game is ranked in the top position, because two close friends (Emily and Connie), and 18 more friends are currently viewing the program (as shown in FIG. 1C). In other implementations, the organization can be horizontal. The ranking may be provided in any format that denotes a ranking to the user (e.g., visual, audio (e.g., a screenreader), etc.).

As shown in FIG. 1B, the ranking of the programs includes the program listing and the program channel or source. In other implementations, the display of programs includes more information than what is shown in FIG. 1B. For example, the display of programs may include an indicator related to a social contact. The indicator related to a social contact may include a statement, action, or direction provided by the social contact, e.g., "Gretchen has nudged this television program for you." In other implementations, more information regarding each program may be provided than what is shown in FIG. 1C, such as, additional programs that the user may like, comments made by the current social contacts that are viewing the program, etc.

In FIG. 1C, a display of one of the programs from the ranking is provided in response to user selection of the football game in FIG. 1B. The selection of football game may include providing the user with additional information, as shown in FIG. 1C, such as additional social contact information, comments made regarding the football game, hyperlinks to additional information (e.g., the roster of the football team), etc. The selection of program content may also display the social contacts currently viewing the program (e.g., Emily, Connie and 18 other friends). The names of the social contacts, the images of the social contacts, or any other social contact identifier may also be displayed. Messages or other feedback (e.g., Like, DisLike, etc.) may also be displayed alongside or near each social contact identifier. In other implementations, the program content display includes social contacts that previously viewed the program. In some implementations, the program content display includes recommendations by social contacts. For example, a social contact may provide alternative programs that the user may be interested in viewing. In another example, a social contact may suggest related content to the currently viewed program (e.g., music, videos, news articles, etc.)

In other implementations, the system may determine the ranking of the program listing as shown in FIG. 1B. For example, the user may determine that program content that Emily is currently viewing should not be considered in the ranking and may accordingly remove Emily from the ranking, but not from the user's social contacts. In other implementations, the user may determine that Emily's recommendations and/or other actions (currently viewing, previously viewing, etc.) should take priority over other social contacts and accordingly upgrade the social contact for use in ranking the program content.

In some implementations, the system may determine the ranking of the program listing by accounting for an affinity ("how close") the user has with a social contact. Social networking data may be received to assign weights to the edges in a social graph that connect each user to a social contact. The "closer" the user is with a social contact, the higher the weight assigned to the edge. The weight may be used to rank the program listing.

In another example, the system may be configured to determine that the user consistently or frequently selects programs that Emily is currently viewing, recommends, etc. The ranking of the program listing may be automatically determined by the system, which may list Emily's programs in the first position on the program listing due to the user's previous selections.

Figure 1D:
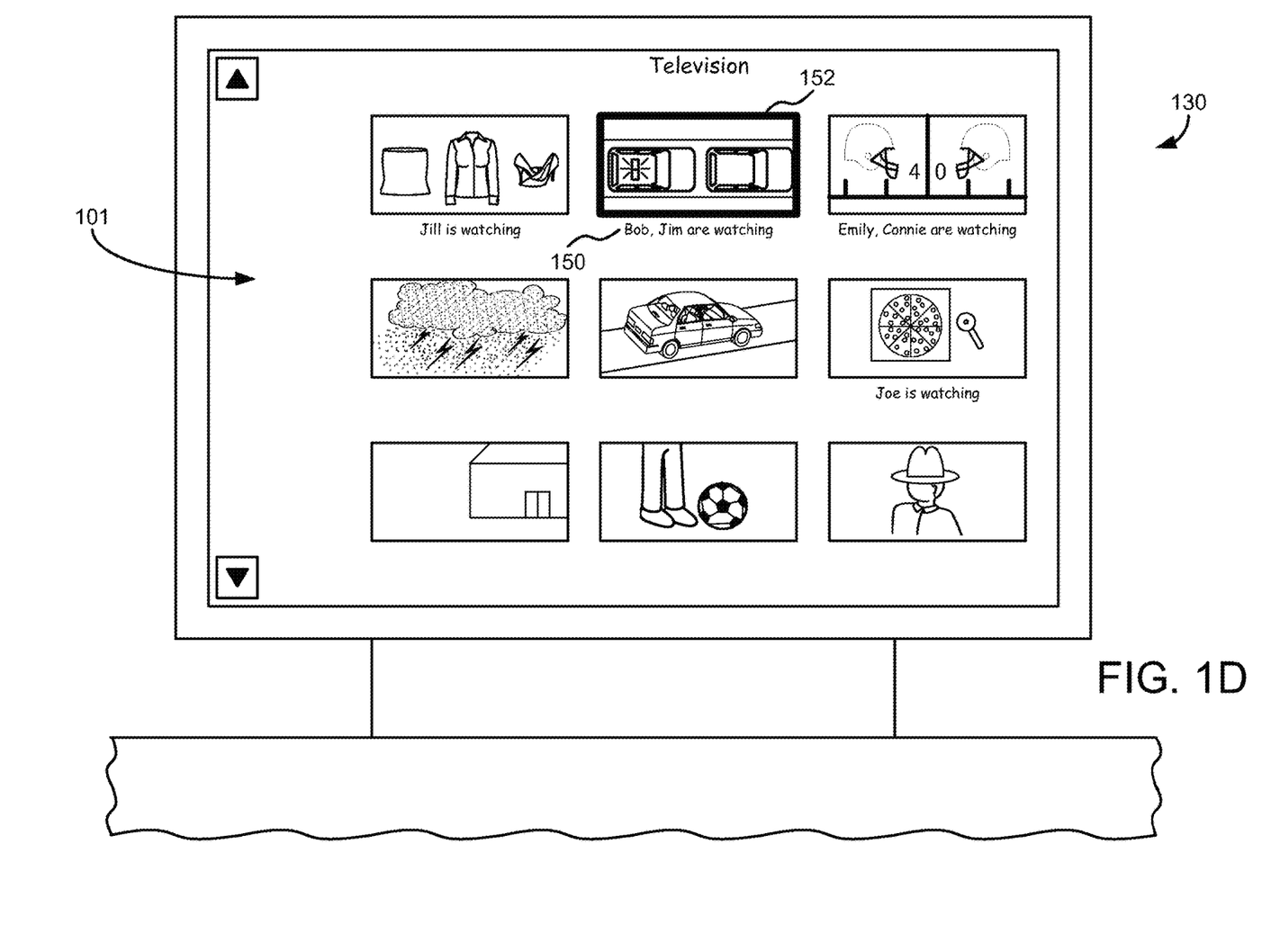
FIG. 1D illustrates a user interface in accordance with a described implementation.

FIG. 1D is an example user interface 130 in accordance with a described implementation. User interface 130 may include one channel/program feed at a time, simultaneous multiple channel/program feeds, text feeds, etc. For example, in a single feed user interface, the user may switch the television to the "social surfing" mode. When the user changes the channel/program up or down, the television flips through channels/programs that the user's social contacts are currently watching and/or have shared with the user. The channel/program may be annotated with information 150 about social contacts who are currently viewing the program (e.g., "Astrid and George are currently watching this.") The user may step through channels via the television, starting with the channel/program that the user is most likely to like, e.g., initially displaying channels/programs that the user is most likely to like based on what social contacts are watching, social contact affinity, past channel viewing history, other user profile data, etc.

As shown in FIG. 1D, a multiple channel/program feed user interface 130 is illustrated. The user may view video feeds for multiple channels/programs at once or simultaneously, in which the channels/programs may be arranged in a grid. The audio may play only for the feed highlighted 152 by the user, in response to the user selection of one of the portions of the displayed grid.

The user may move to any displayed channel/program and select the channel/program to view the channel/program full screen on the television. In one example, a single click of a mouse or touch pad will select the program, highlight the program (e.g., with a darkened outline or box), and begin play of the audio from the program. A double click or second click on the program will cause the program to be viewed in a larger box or full screen, and/or cause other program boxes to be removed from the display area. Each box of user interface 130 may show a video. The highlighted box 152 may show a video feed and audio. Each channel/program depicted by each box of user interface 130 may be socially annotated, i.e., information regarding the user's social contacts, as shown in social annotation 150. Each of the display areas of interface or screen 130 may represent a single pane of a multi-pane display.

Figure 2:
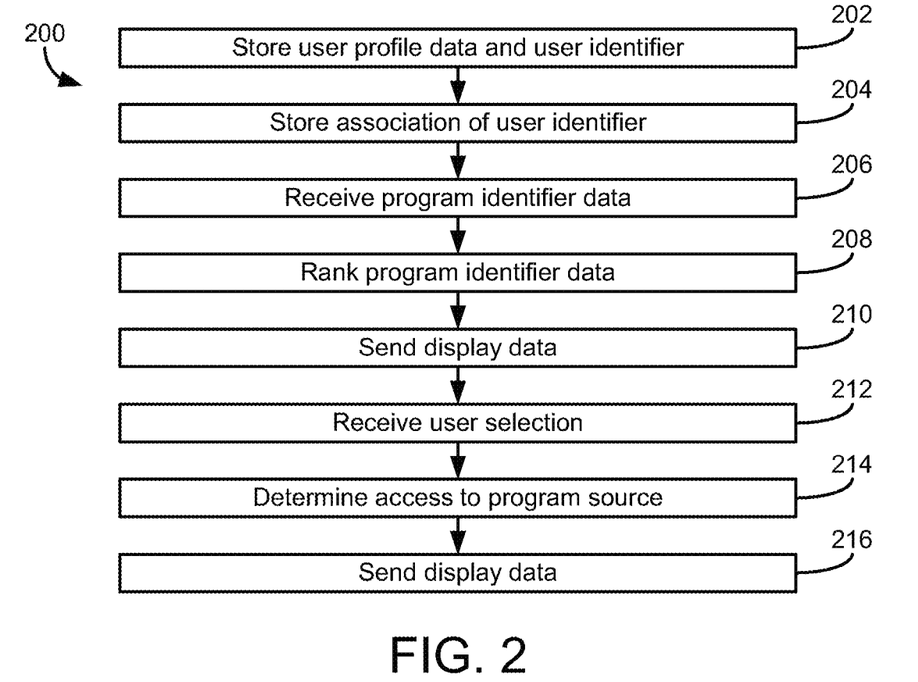
FIG. 2 is a flow diagram of a method in accordance with a described implementation.

FIG. 2 is a flow diagram of a method for providing a program listing of programs being viewed by a plurality of social contacts in accordance with a described implementation. The method 200 is provided by way of example, as there are a number of ways to carry out the methods according to the present disclosure. The method 200 shown in FIG. 2 may be executed or otherwise performed by one of a combination of various systems. The method 200 may be implemented by a computer, a computer program product, a client, a server, a client-server relationship, etc. The method 200 is described herein as carried out by the system 600 of FIG. 6, by way of example.

Example method 200 begins at block 202, in which a user profile data and a user identifier for a user is stored. The user profile data and/or user identifier may be stored in a memory. The user identifier may include, but is not limited to, the name of the user, the social networking identifier, the IP address of the user, the device of the user, and any other appropriate user identifier.

At block 204, an association of the user identifier with user identifiers for each of the plurality of social contacts of the user is stored. In some implementations, the association between the user identifier and the user identifiers for the plurality of social contacts of the user is stored in memory on a mobile computing device (e.g., a smart television), a server device (e.g., a social networking website), or other memory. The user identifiers for the social contacts may include, but is not limited to, the names of the social contacts, the social networking identifier, the IP addresses of the social contacts, the device of the social contacts, and any other appropriate user identifiers.

At block 206, program identifier data representing programs currently being viewed by the social contacts is received from the plurality of social contacts of the user. Program identifier data may include, but is not limited to, the name of the program, the source of the program, details of the program, etc.

At block 208, program identifier data for each of the plurality of social contacts is ranked based at least in part on the user profile data. In some implementations, the user profile data may include, but is not limited to, relationship(s) between the user and the social contact (e.g., association between the user's profile and the social contact's profile), relevance associated with the user profile data, etc.

At block 210, display data representing the program identifier data for display in an order based on the ranking is sent. At block 212, a user selection of one of the program identifiers is received from the user. For example, the user determines which program that they would like to view.

At block 214, a determination is made whether the user has access to a program source providing the program identified by the program identifier. For example, the user may not have access to a pay-per-view program that is included within the ranking. In another example, a determination may be made whether the program content is appropriate to be provided to the user. For example, the user may have a "safe" setting, parental restrictions, etc. that prevent R-rated content from being displayed regardless whether they are shared by a social contact. At block 216, based on the determination, display data representing the selected program is sent to the user.

Figure 3:
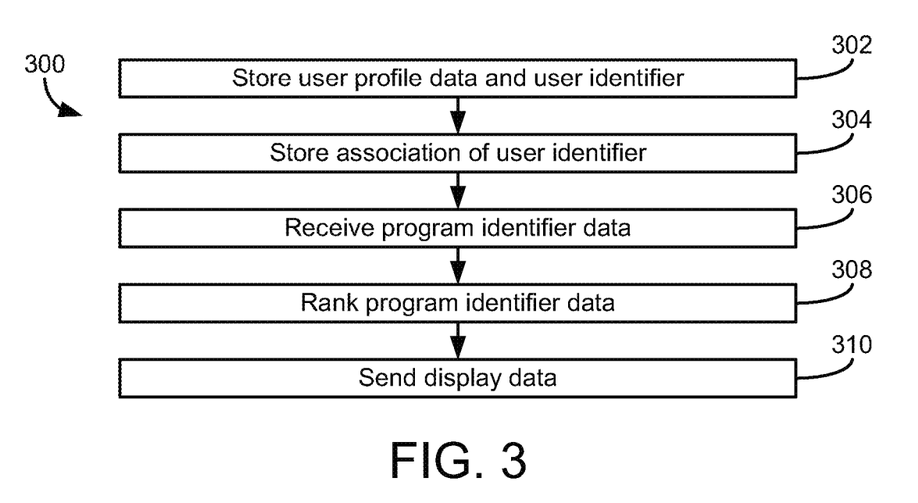
FIG. 3 is a flow diagram of a method in accordance with a described implementation.

FIG. 3 is a flow diagram of a method for providing a program listing of programs being viewed by a plurality of social contacts in accordance with a described implementation. The method 300 is provided by way of example, as there are a number of ways to carry out the methods according to the present disclosure. The method 300 shown in FIG. 3 may be executed or otherwise performed by one of a combination of various systems. The method 300 may be implemented by a computer, a computer program product, a computer program, a client, a server, a client-server relationship, etc. The method 300 is described herein as carried out by the system 600 of FIG. 6, by way of example.

Example method 300 begins at block 302, in which a user profile data and a user identifier for a user is stored. The user profile data and/or user identifier may be stored in a memory. The user identifier may include, but is not limited to, the name of the user, the social networking identifier, the IP address of the user, and any other appropriate user identifier.

At block 304, an association of the user identifier with user identifiers for each of the plurality of social contacts of the user is stored. In some implementations, the association between the user identifier and the user identifiers for the plurality of social contacts of the user is stored in memory on a mobile computing device (e.g., a smart television), a server device (e.g., a social networking website), or other memory. The user identifiers for the social contacts may include, but is not limited to, the names of the social contacts, the social networking identifier, the IP addresses of the social contacts, and any other appropriate user identifiers.

The association may represent a plurality of relationships with the user. Each relationship may represent a different relationship with the user. In some implementations, the plurality of relationships include a social relationship connection within a social network. The social relationship connection may include at least one of a level and a degree. A level may include top friend, friend, acquaintance, following, levels defined by the user, etc. A degree may include how many shared contacts between the user and the social contact, how many shared interests between the user and the social contact, degrees defined by the user, etc.

At block 306, program identifier data representing programs currently being viewed by the social contacts is received. Program identifier data may include, but is not limited to, name of the program, location of the program, details of the program, etc.

At block 308, program identifier data for each of the plurality of social contacts is ranked based on the user profile data. In some implementations, the user profile data may include, but is not limited to, relationship(s) between the user and the social contact (e.g., association between user's profile and social contact's profile), relevance associated with user profile data, etc. The program identifier may be ranked based on recommendations of the social contacts. The program identifier data may be ranked by specific categories, for example, genre, actor(s), length, etc.

At block 310, display data representing the program identifier data for display in an order based on the ranking is sent. In some implementations, the user may select one of the program identifiers. In some implementations, a determination may be made as to whether the user has access to a program source providing the program identified by the program identifier. In another example, a determination may be made whether the program content is appropriate to be provided to the user. For example, the user may have a "safe" setting, parental restrictions, etc. that prevent R-rated content from being displayed regardless whether they are shared by a social contact. In some implementations, display data representing the selected program to the user may be sent based on the determination. For example, the user may have access to the program, in which case, the display data representing the selected program may be displayed. Alternatively, the user may not have access to the program, in which case, the program may or may not be displayed.

In some implementations, an update to the association of the user with the social contacts may be received. The user may remove, add, modify the level or degree, or take any other action with regard to the plurality of social contacts. For example, the user may delete one of the social contacts. In some implementations, an update to the programs currently being viewed by one of the social contacts may be received. The update may represent a change in the program currently being viewed by the social contact. The update may include a new program identifier. The user may edit programs, delete programs, add programs, or take any other action with regard to the programs currently being viewed.

In other implementations, a change to the user profile data may be received. For example, the user may change their favorites, interest, or any content that is related to the program identifier data. In some implementations, an indication of a recommendation for a program from a social contact is received. For example, a social contact may recommend a program for the user. In some implementations, an indication of an input rating by a social contact (e.g., "+1", "like", etc.) may be received The ranking of the program identifier data may be rearranged based on the changed user profile data, update, recommendation, etc. In some implementations, an affinity score may be determined between the user and the social contact, which may rearrange the ranking. In some implementations, the rearrangement of the ranking may occur in real-time. In some implementations, the rearrangement of the ranking may be determined by the user (e.g., user preferences). In some implementations, the rearrangement of the ranking may be determined by the system. The rearrangement may be automatic, delayed (e.g., pending confirmation by the user), etc.

Figure 4:
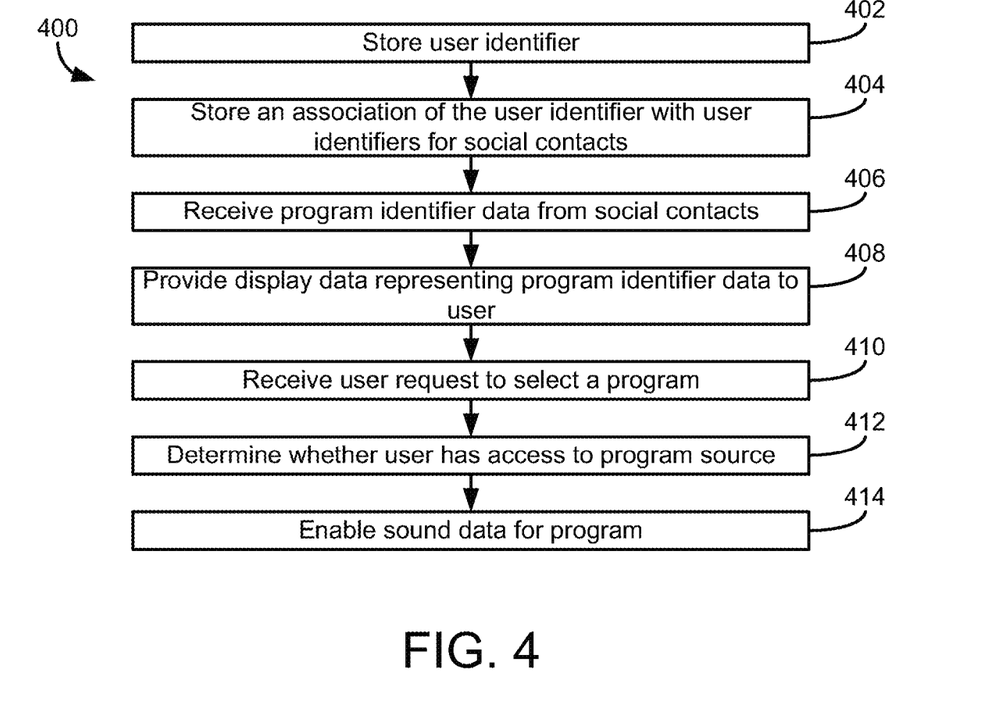
FIG. 4 is a flow diagram of a method in accordance with a described implementation.

FIG. 4 is a flow diagram of a method for providing a multi-pane display of programs being viewed by a plurality of social contacts in accordance with a described implementation. The method 400 is provided by way of example, as there are a number of ways to carry out the methods according to the present disclosure. The method 400 shown in FIG. 4 may be executed or otherwise performed by one of a combination of various systems. The method 400 may be implemented by a computer, a computer program product, a client, a server, a portion operating on each of a client and a server, etc. The method 400 is described herein as carried out by the system 600 of FIG. 6, by way of example.

Example method 400 begins at block 402, in which a user identifier for a user is stored. The user identifier may be stored in a memory on a mobile computing device (e.g., a smart television), a server device (e.g., a social networking website), or other memory. The user identifier may include, but is not limited to, the name of the user, the social networking identifier, the IP address of the user, the device of the user, or any other appropriate user identifier.

At block 404, an association of the user identifier with user identifiers for each of the plurality of social contacts of the user is stored. In some implementations, the association between the user identifier and the user identifiers for the plurality of social contacts of the user is stored in memory on a mobile computing device (e.g., a smart television), a server device (e.g., a social networking website), or other memory. The user identifiers for the social contacts may include, but are not limited to, the names of the social contacts, the social networking identifiers, the IP addresses of the social contacts, the devices of the social contacts, and any other appropriate user identifiers. Social contacts may include other users who may have a relationship with the user, such as friends, co-workers, etc., or may also include celebrities or other users who do not necessarily have a personal relationship with the user. The association may comprise a connection, friend, acquaintance, circle, or other user-defined or system-defined association.

At block 406 program identifier data representing programs currently being viewed by the social contacts is received from the plurality of social contacts of the user. Program identifier data may include, but is not limited to, name of the program, channel and/or source of the program or other data that may help identify the program. Other metadata about the program may also be provided, such as genre, type, rating, etc.

At block 408 display data representing a plurality of the program identifier data is provided to the user. In some implementations, the display data is configured to align each of the plurality of program identifier data with an identifier of the social contact viewing or who previously viewed the program associated with the program identifier in a multi-pane display.

At block 410, a user request to select a currently viewed program within the multi-pane display is received. At block 412, a determination is made whether the user has access to a program source providing the program identified by the program identifier. In another example, a determination may be made whether the program content is appropriate to be provided to the user. For example, the user may have a "safe" setting, parental restrictions, etc. that prevent R-rated content from being displayed regardless whether they are shared by a social contact. At block 414, sound data is enabled for the selected program.

Figure 5:
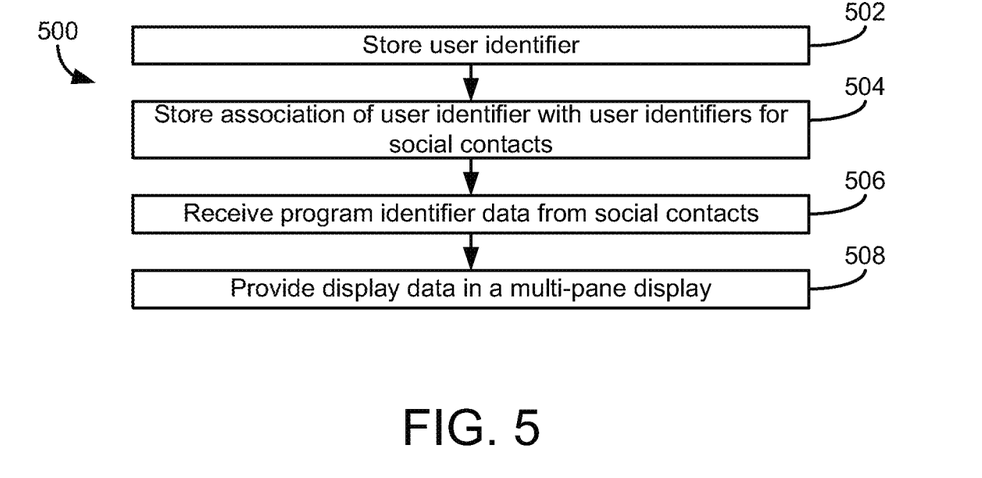
FIG. 5 is a flow diagram of a method in accordance with a described implementation.

FIG. 5 is a flow diagram of a method for providing a multi-pane display of programs being viewed by a plurality of social contacts in accordance with a described implementation. The method 500 is provided by way of example, as there are a number of ways to carry out the methods according to the present disclosure. The method 500 shown in FIG. 5 may be executed or otherwise performed by one of a combination of various systems. The method 500 may be implemented by a computer, a computer program product, a client, a server, a client-server relationship, etc. The method 500 is described herein as carried out by the system 600 of FIG. 6, by way of example.

Example method 500 begins at block 502, in which a user identifier for a user is stored. The user identifier may be stored in a memory on a mobile computing device (e.g., a smart television), a server device (e.g., a social networking website), or other memory. The user identifier may include, but is not limited to, the name of the user, the social networking identifier, the IP address of the user, the device of the user, and any other appropriate user identifier.

At block 504, an association of the user identifier with user identifiers for each of the plurality of social contacts of the user is stored. In some implementations, the association between the user identifier and the user identifiers for the plurality of social contacts of the user is stored in memory on a mobile computing device (e.g., a smart television), a server device (e.g., a social networking website), or other memory. The user identifiers for the social contacts may include, but is not limited to, the names of the social contacts, the social networking identifiers, the IP addresses of the social contacts, the devices of the social contacts, and any other appropriate user identifiers.

The association may represent a plurality of relationships with the user. Each relationship may represent a different relationship with the user. In some implementations, the plurality of relationships include a social relationship connection within a social network. The social relationship connection may include at least one of a level and a degree. A level may include top friend, friend, acquaintance, following, levels defined by the user, etc. A degree may include how many shared contacts between the user and the social contact, how many shared interests between the user and the social contact, degrees defined by the user, etc.

At block 506, program identifier data representing programs currently being viewed by the social contacts is received from the plurality of social contacts of the user. Program identifier data may include, but is not limited to, name of the program, location of the program, details of the program, etc.

At block 508, display data in a multi-pane display is provided. In some implementations, the multi-pane display displays a plurality of video programs simultaneously shared by the social contacts. In some implementations, the multi-pane display includes simultaneous (real time) video streams of a plurality of the programs based on user accessibility to a program source providing the program identified by the program identifier. The multi pane display may be real time, i.e., the multi-pane display may change when programs that social contacts are viewing, recommend, etc. are updated.

Method 500 may further include receiving a user request to select a currently viewed program within the multi-pane display. In some implementations, a determination may be made as to whether the user has access to a program source providing the program identified by the program identifier. In another example, a determination may be made whether the program content is appropriate to be provided to the user. For example, the user may have a "safe" setting, parental restrictions, etc. that prevent R-rated content from being displayed regardless whether they are shared by a social contact. If the user does have access to the program source or the program content is determined to be appropriate, then the playing of sound data may be enabled for the selected program. If the user does not have access to the program source, then the system may notify the user. For example, providers of program content encrypt the content so only users that have access to the program source can decrypt the scrambled data into usable data, i.e., programs.

In some implementations, an indication of the selected program is provided to the user. For example, the user may select a program and the system may indicate that the program is available, the program is currently being viewed by a social contact, the program is highly recommended, etc. The indication may include visual feedback, audio feedback (e.g., a screenreader), etc. For example, the user may select the program and the indication may highlight the program, provide audio data (e.g., "program is not available"), etc.

In some implementations, display data may represent a plurality of the program identifier data to the user. The display data may be configured to align each of the plurality of program identifier data with an identifier of the social contact viewing or who previously viewed the program associated with the program identifier in a multi-pane display. For example, as shown in FIG. 1D, annotations, such as "Astrid is watching the program", may accompany each pane within the display.

The program identifier data may include feedback by social contacts, wherein the feedback includes electronic messages. For example, Astrid may comment on the program that she is watching, direct the user to watch the program, send a link to the program, etc. The feedback may also include an audio message, e.g., voice over internet protocol (VoIP), audio over internet protocol (AoIP), etc.

In some implementations, the user may set up the panes in the multi-pane display. The user may create the number of panes. For example, the user may create two panes that show programs that a best friend and a parent are currently viewing. The user may create two other panes: one that display programs that were recommended and another that displays programs that were previously viewed. The user may create a first pane that displays the selected program and a second pane that displays additional information to the selected program. Multiple attributes may be combined into one pane. For example, the user may create a pane to show both programs that have been currently viewed and recommended. The user may drag and drop programs into the multi-panes.

In some implementations, the multi-pane display may display a dual screen configuration. For example, the top (or side, etc.) may display a program, while the bottom (or side, etc.) may display an electronic programming guide, user's profile, user's social contacts, etc. In other implementations, the top screen may display a program, while the bottom screen implements the social surfing mode, i.e., allowing the user to browse, queue, etc. other programs.

Figure 6:
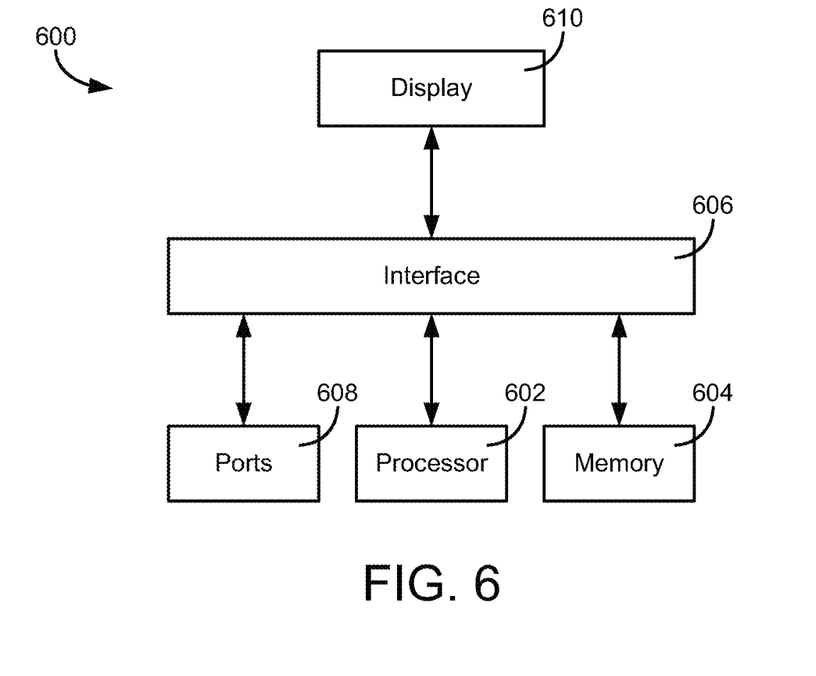
FIG. 6 is a block diagram of devices that may be used to implement the systems and methods in accordance with the described implementations.

FIG. 6 is a block diagram of a computing device 600 that may be used to implement the systems and methods in accordance with the described implementations, as either a client or as a server or plurality of servers. Computing device 400 may include, but is not limited to, digital computers, such as laptops, desktops, workstations, personal digital assistants, servers, blade servers, mainframes, cellular telephones, smartphones, mobile computing devices (e.g., a notepad, e-reader, etc.) etc.

Computing device 600 includes a processor 600, memory 404, an interface 406 and ports 408. Each of the components 602, 604, 606, and 608, are interconnected using various busses, and may be mounted on a common motherboard or in other manners as appropriate. The processor 602 can process instructions for execution within the computing device 600, including instructions stored in the memory 604 to display graphical information for a GUI on an external input/output device, such as display 610 coupled to interface 606.

In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, a multi-processor system, etc.). The ports 608, which may include various communication ports (e.g., USB, Bluetooth, Ethernet, wireless Ethernet, etc.), may be coupled to one or more input/output devices, such as a keyboard, a mouse, a pointing device, a scanner, etc., or a networking device (a switch, adapter, bridge, router, hub, repeater, etc.).

The processor 602 may provide, for example, for coordination of the other components of the device 600, such as control of user interfaces, applications run by device 600, and wireless communication by device 600. Processor 602 may communicate with a user via interface 606 (e.g., control, display, external, etc.), coupled to a display 610. The display 610 may be, for example, a TFT (Thin-Film-Transistor Liquid Crystal Display) display, an OLED (Organic Light Emitting Diode) display, other flexible display, etc. The interface 606 may include circuitry for driving the display 610 to provide graphical, textual, and other information to a user. The interface 606 may receive commands (e.g., voice-activated, text, etc.), from a user and convert them to provide to the processor 602.

In addition, the interface 606 may be provided to communicate with processor 602 and enable near area communication of device 600 with other devices. The interface 606 may provide, for example, for wired communication. In some implementations, multiple interfaces may be used. Computing device 600 may communicate wirelessly through interface 606, which may include digital signal processing circuitry where necessary. Interface 606 may provide for communications under various modes or protocols, such as GSM voice calls, SMS, EMS, or MMS messaging, CDMA, TDMA, PDC, WCDMA, CDMA2000, or GPRS, etc. Such communication may occur, for example, through a radio-frequency transceiver. In addition, short-range communication may occur, such as using a Bluetooth, WiFi, or other such transceiver. In addition, GPS (Global Positioning System) receiver module may provide additional navigation- and location-related wireless data to device 600, which may be used as appropriate by applications running on device 600. The device 600 may also be provided with a storage device to provide additional storage, e.g., solid-state flash media. Each of the components may be interconnected using various buses. Several of the components may be mounted on a common motherboard or in other appropriate manners.

Device 600 may communicate audio feedback. In some implementations, an audio codec may receive spoken information from a user and convert it to usable digital information. The audio codec may generate audible sound for a user, such as through a speaker, e.g., in a handset of device. Sound(s) may include sound from voice telephone calls, recorded sound (e.g., voice messages, music files, etc.), sound(s) generated by applications operating on device, etc.

The memory 604 stores information within the computing device 600. In one implementation, the memory 604 is a volatile memory unit or units. In another implementation, the memory 604 is a non-volatile memory unit or units. The memory 604 may also be another form of a tangible computer-readable storage device, such as a magnetic or optical disk. The memory 604 may be capable of providing mass storage for the computing device 600. In one implementation, the memory 604 may be or contain a computer-readable medium, such as a floppy disk device, a hard disk device, an optical disk device, or a tape device, a flash memory or other similar solid state memory device, or an array of devices, including devices in a storage area network or other configurations.

A computer program product may be tangibly embodied in an information carrier. The computer program product may also contain instructions that, when executed, perform one or more methods, such as those described above. The information carrier is a computer or machine-readable medium, such as the memory 604, memory on processor 602, a propagated signal, etc. Expansion memory may be provided and connected to device 600 through interface 606.

These computer programs (e.g., programs, software, software applications or code), include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Controllers (PLCs) Programmable Logic Devices (PLDs)), used to provide machine instructions and/or data to a programmable processor.

To provide for interaction with a user, the systems and techniques described here can be implemented on a computer having a display device (e.g., a CRT (cathode ray tube) or LCD (liquid crystal display) monitor), for displaying information to the user and a keyboard and a pointing device (e.g., a mouse or a trackball), by which the user can provide input to the computer. Other kinds of devices can be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Various implementations of the systems and techniques described here can be realized in digital electronic circuitry, integrated circuitry, specially designed ASICs (application specific integrated circuits), computer hardware, firmware or software embodied on a tangible medium, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back-end component, a middleware component, or a front-end component, or any combination of back-end, middleware, or front-end components. The components of the system may be interconnected by any form or medium of digital data communication (e.g., a communication network). Examples of communication networks include a local area network ("LAN"), a wide area network ("WAN"), and the Internet.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for providing displays of media content consumed by a plurality of social contacts of a user, the method comprising:
receiving, using a hardware processor, content identifier data representing media content items indicated as being consumed by the plurality of social contacts associated with a user, wherein each of the content identifier data was automatically generated in response one of the plurality of social contacts consuming at least a portion of one of the media content items;
receiving, from a plurality of sharing applications that are each associated with one of the plurality of social contacts, an indication to share consumption of one or more of the plurality of media content items with a user account of the user; and
providing, using the hardware processor, display data in a multi-pane display, wherein the multi-pane display presents, in a first pane, a plurality of media content items which have each been shared with the user by one or more of the plurality of social contacts using the plurality of sharing applications, wherein each of the plurality of media content items corresponds to one of the media content items in the content identifier data.

2. The method of claim 1, further comprising:
receiving a user identifier associated with the user; and
determining an association of the user identifier with user identifiers for each of the plurality of social contacts of the user.

3. The method of claim 2, wherein providing the display data further comprises presenting the display data along with a plurality of the content identifier data to the user, wherein the display data is configured to align each of the plurality of content identifier data with one of the plurality of user identifiers of one of the plurality of social contacts that is currently consuming, or has previously consumed, the media content item associated with the content identifier.

4. The method of claim 1, further comprising annotating each of the plurality of media content items in the first pane of the multi-pane display with information indicating which social contacts from the plurality of social contacts are currently consuming that media content item.

5. The method of claim 1, further comprising annotating each of the plurality of programs in the first pane of the multi-pane display with information indicating which social contacts from the plurality of social contacts previously consumed that media content item.

6. The method of claim 1, further comprising:
receiving a request to select a media content item from the plurality of media content items being presented within the multi-pane display;
determining whether the user account has access to a content source that provides the selected media content item; and
causing audio data corresponding to the selected media content item to be presented.

7. The method of claim 1, wherein at least one of the plurality of media content items is presented with an alternative media content item to consume that was shared by one of the plurality of social contacts.

8. The method of claim 1, further comprising receiving feedback from one of the plurality of social contacts, wherein the feedback comprises an electronic message relating to a program being viewed by one of the plurality of social contacts.

9. The method of claim 1, wherein the multi-pane display presents simultaneous media streams of the media content item of the media content items.

10. The method of claim 1, further comprising:
receiving a request from the user to set up a pane arrangement in the multi-pane display;

in response to receiving the request, receiving a selection of a first social contact from the plurality of social contacts; and in response to receiving the selection of the first social contact from the plurality of social contacts, configuring the pane arrangement of the multi-pane display to include a second pane that includes one or more media content items that have been shared by the first social contact.

11. The method of claim 1, further comprising configuring a pane arrangement of the multi-pane display to include a second pane that includes media content items that have been previously consumed by one of the plurality of social contacts and a third pane that includes media content items that are being currently consumed by one of the plurality of social contacts.

12. A system for providing displays of media content consumed by a plurality of social contacts of a user, the system comprising:
a memory; and
a hardware processor that, when executing computer executable instructions stored in the memory, is configured to:
receive content identifier data representing media content items indicated as being consumed by the plurality of social contacts associated with a user, wherein each of the content identifier data was automatically generated in response one of the plurality of social contacts consuming at least a portion of one of the media content items;
receive, from a plurality of sharing applications that are each associated with one of the plurality of social contacts, an indication to share consumption of one or more of the plurality of media content items with a user account of the user; and
provide display data in a multi-pane display, wherein the multi-pane display presents, in a first pane, a plurality of media content items which have each been shared with the user by one or more of the plurality of social contacts using the plurality of sharing applications, wherein each of the plurality of media content items corresponds to one of the media content items in the content identifier data.

13. The system of claim 12, wherein the hardware processor is further configured to:
receive a user identifier associated with the user; and
determine an association of the user identifier with user identifiers for each of the plurality of social contacts of the user.

14. The system of claim 13, wherein providing the display data further comprises presenting the display data along with a plurality of the content identifier data to the user, wherein the display data is configured to align each of the plurality of content identifier data with one of the plurality of user identifiers of one of the plurality of social contacts that is currently consuming, or has previously consumed, the media content item associated with the content identifier.

15. The system of claim 12, wherein the hardware processor is further configured to annotate each of the plurality of media content items in the first pane of the multi-pane display with information indicating which social contacts from the plurality of social contacts are currently consuming that media content item.

16. The system of claim 12 wherein the hardware processor is further configured to annotate each of the plurality of programs in the first pane of the multi-pane display with information indicating which social contacts from the plurality of social contacts previously consumed that media content item.

17. The system of claim 12, wherein the hardware processor is further configured to:
receive a request to select a media content item from the plurality of media content items being presented within the multi-pane display;
determine whether the user account has access to a content source that provides the selected media content item; and
cause audio data corresponding to the selected media content item to be presented.

18. The system of claim 12, wherein at least one of the plurality of media content items is presented with an alternative media content item to consume that was shared by one of the plurality of social contacts.

19. The system of claim 12, wherein the hardware processor is further configured to receive feedback from one of the plurality of social contacts, wherein the feedback comprises an electronic message relating to a program being viewed by one of the plurality of social contacts.

20. The system of claim 12, wherein the multi-pane display presents simultaneous media streams of the media content item of the media content items.

21. The system of claim 12, wherein the hardware processor is further configured to:
receive a request from the user to set up a pane arrangement in the multi-pane display;
in response to receiving the request, receive a selection of a first social contact from the plurality of social contacts; and
in response to receiving the selection of the first social contact from the plurality of social contacts, configure the pane arrangement of the multi-pane display to include a second pane that includes one or more media content items that have been shared by the first social contact.

22. The system of claim 12, wherein the hardware processor is further configured to configure a pane arrangement of the multi-pane display to include a second pane that includes media content items that have been previously consumed by one of the plurality of social contacts and a third pane that includes media content items that are being currently consumed by one of the plurality of social contacts.

23. A non-transitory computer-readable medium comprising computer-executable instructions that, when executed by a processor, cause the processor to perform a method for providing displays of media content consumed by a plurality of social contacts of a user, the method comprising:
receiving content identifier data representing media content items indicated as being consumed by the plurality of social contacts associated with a user, wherein each of the content identifier data was automatically generated in response one of the plurality of social contacts consuming at least a portion of one of the media content items;
receiving, from a plurality of sharing applications that are each associated with one of the plurality of social contacts, an indication to share consumption of one or more of the plurality of media content items with a user account of the user; and
providing display data in a multi-pane display, wherein the multi-pane display presents, in a first pane, a plurality of media content items which have each been shared with the user by one or more of the plurality of social contacts using the plurality of sharing applications, wherein each of the plurality of media content items corresponds to one of the media content items in the content identifier data.

* * * * *